(12) United States Patent
Snow et al.

(10) Patent No.: US 12,325,768 B2
(45) Date of Patent: Jun. 10, 2025

(54) LIGHT-CURABLE COMPOSITIONS USEFUL FOR FORMING COMPOSITE MATERIALS

(71) Applicant: Arkema France, Colombes (FR)

(72) Inventors: Kyle Snow, King of Prussia, PA (US); William Wolf, King of Prussia, PA (US)

(73) Assignee: Arkema France, Colombes (FR)

( * ) Notice: Subject to any disclaimer, the term of this patent is extended or adjusted under 35 U.S.C. 154(b) by 686 days.

(21) Appl. No.: 17/606,105

(22) PCT Filed: Apr. 23, 2020

(86) PCT No.: PCT/IB2020/000417
§ 371 (c)(1),
(2) Date: Oct. 25, 2021

(87) PCT Pub. No.: WO2020/217101
PCT Pub. Date: Oct. 29, 2020

(65) Prior Publication Data
US 2022/0213245 A1 Jul. 7, 2022

Related U.S. Application Data

(60) Provisional application No. 62/838,372, filed on Apr. 25, 2019.

(51) Int. Cl.
| | |
|---|---|
| *C08F 2/46* | (2006.01) |
| *B29C 35/08* | (2006.01) |
| *B33Y 70/00* | (2020.01) |
| *C08F 2/50* | (2006.01) |
| *C08F 122/32* | (2006.01) |
| *C08F 222/32* | (2006.01) |
| *C08G 61/04* | (2006.01) |
| *C08J 5/04* | (2006.01) |
| *C09D 135/04* | (2006.01) |
| *B29C 64/124* | (2017.01) |
| *B29K 33/04* | (2006.01) |
| *B29K 507/04* | (2006.01) |
| *B33Y 10/00* | (2015.01) |

(52) U.S. Cl.
CPC ...... *C08F 222/327* (2020.02); *B29C 35/0805* (2013.01); *B33Y 70/00* (2014.12); *C08F 122/32* (2013.01); *C08J 5/042* (2013.01); *C09D 135/04* (2013.01); *B29C 2035/0827* (2013.01); *B29C 64/124* (2017.08); *B29K 2033/04* (2013.01); *B29K 2507/04* (2013.01); *B33Y 10/00* (2014.12); *C08J 2335/04* (2013.01)

(58) Field of Classification Search
CPC .... C08F 2/48; C08F 222/327; C08F 222/103; C08F 222/102; C08F 122/32; B33Y 70/00; B33Y 10/00; B29C 2035/0827; B29C 64/124; C09D 4/00; C09D 135/04; C08J 5/042; C08J 2335/04; B29K 2507/04; B29K 2033/04
USPC ................ 522/66, 6, 189, 184, 71, 1; 520/1
See application file for complete search history.

(56) References Cited

U.S. PATENT DOCUMENTS

| | | | |
|---|---|---|---|
| 6,503,959 | B1 | 1/2003 | Nishiyama et al. |
| 7,605,190 | B2 | 10/2009 | Moszner et al. |
| 2016/0357031 | A1 | 12/2016 | Holland et al. |
| 2017/0275414 | A1 | 9/2017 | Kwisnek et al. |
| 2018/0265527 | A1 | 9/2018 | Moszner et al. |

FOREIGN PATENT DOCUMENTS

| | | | |
|---|---|---|---|
| CN | 105838314 A | | 8/2016 |
| JP | 2001089626 | * | 4/2001 |
| JP | 2001089626 A | * | 4/2001 |
| JP | 2001089626 A2 | | 4/2001 |
| JP | 2002322220 A2 | | 11/2002 |
| WO | WO03064483 A1 | | 8/2003 |
| WO | WO16166470 A1 | | 10/2016 |
| WO | WO2017021785 A1 | | 2/2017 |
| WO | WO2019014528 A1 | | 1/2019 |

OTHER PUBLICATIONS

English translation of JP-2001089626-A (OA Appendix). (Year: 2001).*
Nishiyama, JP 2001089626 Machine Translation, Apr. 3, 2001 (Year: 2001).*
Shouha et al, The effect of fiber aspect ratio and volume loading on the flexural properties of flowable dental composite, 2014, Dental Materials, 30, 1234-1244 (Year: 2014).*
International Search Report—PCT/IB2020/000417—Sep. 9, 2020.
Duffy, Cormac, et al., "Radical Polymerization of Alkyl 2-Cyanoacrylates," Molecules, vol. 23, No. 465 (2018).
"Tetraacylgermanes: Highly Efficient Germanium-Based Photoinitiators for Visible-light Induced Free-Radical Polymerization"; Raber et al pp. 1-5.

(Continued)

*Primary Examiner* — Jessica Whiteley
(74) *Attorney, Agent, or Firm* — Christopher R. Lewis

(57) ABSTRACT

Composite materials are formed by photo curing compositions containing one or more cyanoacrylates, substantial amounts of one or more fillers (in particular, opaque and/or fibrous fillers such as carbon fibers) as well as particular photoinitiator systems. The photoinitiator system may comprise, for example, a metallocene compound such as a ferrocene in combination with an acylgermane or other photocleavable compound which generates an acyl radical when exposed to light. Complete, deep curing of such compositions to provide composite materials having improved mechanical properties can be achieved, even though the light used to initiate curing may not be capable of penetrating the entire thickness of the composition due to the presence of the filler.

28 Claims, 1 Drawing Sheet

(56) References Cited

OTHER PUBLICATIONS

Elsvier—Materials Science and Engineering R—"Fundamental Aspects and Recent Progress on Wear/Scratch Damage in Polymer Nanocomosites", Aravind Dasari et al, R 63 (2009) pp. 31-80.
Dental Materials Journal 2013, 31 (5) pp. 737-741; Sufyan Garoushi et al; "Creep of Experimental Short Fiber-Reinforced Composite Resin".
ChemPubSoc Europe—Organometallic Chemistry DOI 10.1002/chem.201705567; Chemistry European Journal Minireview; "Recent Advances in Germanium-Based Photoinitiator Chemistry"; Hass et al; Chem Eur. J. 2018 24, pp. 8258-8267—Wiley Online Library.
Odontology (212) 100: pp. 192-198, DOI 10.1007/a 10266-011-0039-9—Original Article; "Properties of Indirect Composites Reinforced with Monomer-Impregnated Glass Fiber". Naomi Matsumura et al.
Elserver—Science Direct—"The Effect of Fiber Aspect Ratio and Volume Loading on the Flexural Properties of Flowable Dental Composite"; Paul Shauha et al—pp. 1234-1244 2014.

\* cited by examiner

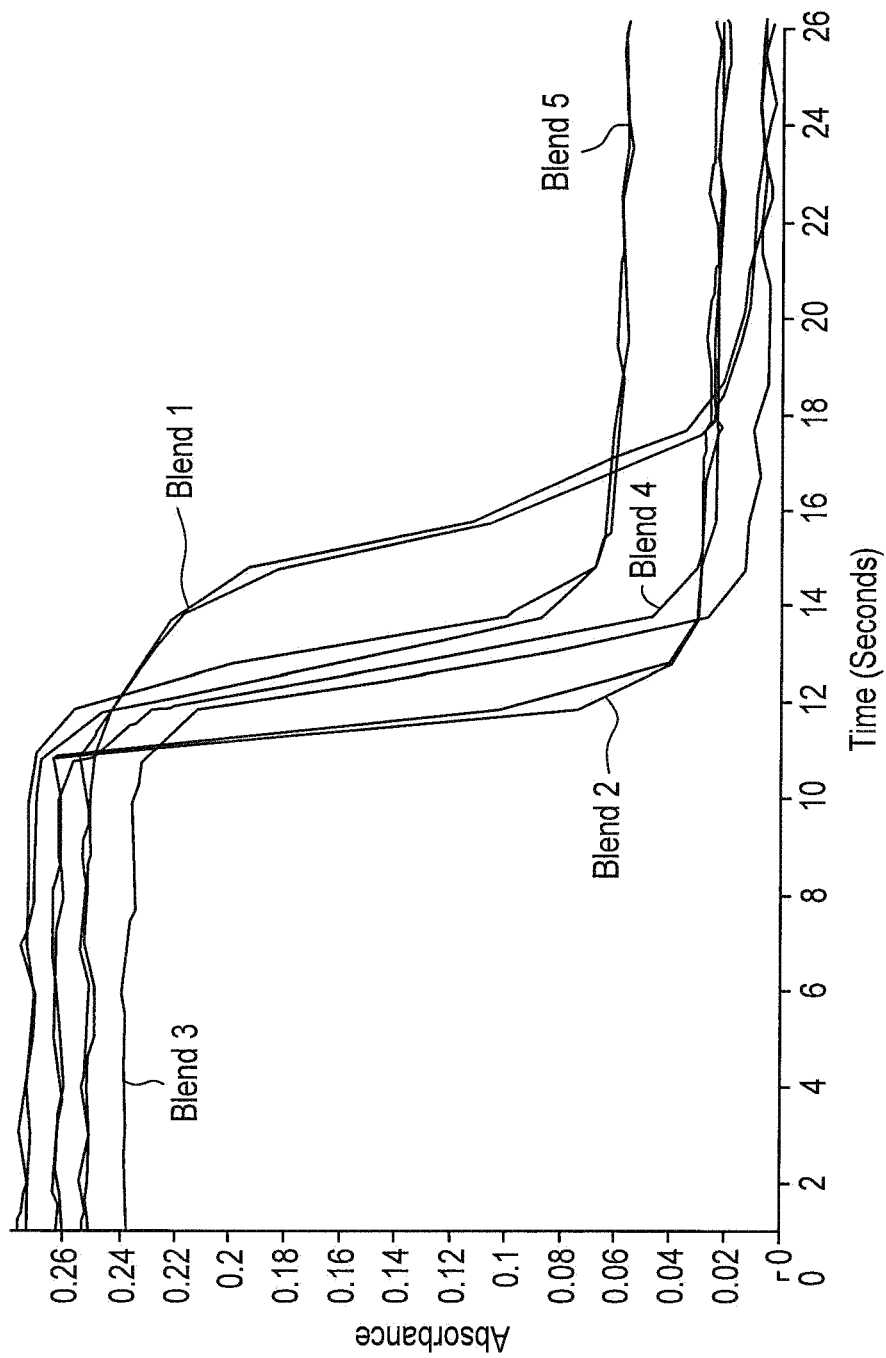

LIGHT-CURABLE COMPOSITIONS USEFUL FOR FORMING COMPOSITE MATERIALS

CROSS-REFERENCE TO RELATED APPLICATIONS

This application is a U.S. national stage application under 35 U.S.C. § 371 of international application number PCT/IB2020/000417, filed Apr. 23, 2020, which claims priority to U.S. patent application No. 62/838,372, filed Apr. 25, 2019.

FIELD OF THE INVENTION

The invention relates to compositions based on cyanoacrylates, particular metallocene-containing photoinitiator systems, and fillers (especially opaque fillers such as carbon fibers) that are capable of being cured throughout their entire depth by exposing the compositions to light, despite the presence of substantial amounts of filler. Useful composite materials are thereby obtained.

BACKGROUND OF THE INVENTION

Additive manufacturing (including 3D printing) has in recent years emerged as a promising, versatile technology for the production of a wide variety of articles and parts. Resin formulations used in additive manufacturing currently include both thermoset polymer resin formulations (i.e., resins that cure to form thermoset polymeric matrices) and thermoplastic-based resin formulations (i.e., resins that melt or soften when heated, but resolidify when cooled). Known thermoset polymer resin formulations include formulations that are capable of being cured by photopolymerization mechanisms. While such formulations have their advantages, it has proven to be challenging to develop photocurable systems that have mechanical properties (e.g., rigidity, stiffness, toughness) that are comparable to those typically possessed by resin formulations based on thermoplastic polymers. In principle, these deficiencies could be overcome by introducing various types of filler materials, such as reinforcing fibers, into such formulations. However, achieving high depth-of-cure in light-curing resins containing opaque filler materials is challenging, since such fillers block the light necessary for curing from fully passing through such filled resins. This problem becomes particularly acute as the amount of filler loading in the resin formulation is increased. Accordingly, the development of highly filled resin systems capable of being readily cured throughout their depth using light irradiation, thereby producing composite materials having excellent mechanical properties, would be of great interest.

Photocurable compositions based on cyanoacrylates are known in the art. For example, U.S. Pat. No. 6,503,959 discloses photocurable compositions comprising (A) an α-cyanoacrylate and (B) a metallocene compound comprising a transition metal of Group VIII of the periodic table and aromatic electron system ligands of certain types. The photocurable composition may further comprise (C) a cleavage-type photoinitiator. The patent mentions that it may be possible to additionally include additives such as pigments and fine silica filler in the photocurable compositions. The manufacture of composite materials based on such photocurable compositions, in particular fiber-reinforced composite materials, is not taught, however.

International Publication No. WO 03/064483 A1 discloses radiation-curable compositions which include a cyanoacrylate component or a cyanoacrylate-containing formulation, a metallocene component, a hydrogen abstraction photoinitiator, and a hydrogen donor component to enhance the activity of the hydrogen abstraction photoinitiator. The preparation of composite materials containing high loadings of filler such as fibrous inorganic fillers is not taught in this publication.

More recently, International Publication No. WO 2017/021785 A1 has disclosed fast light curing adhesive compositions which comprise cyanoacrylate or methylidene malonate monomers or mixtures thereof and certain ferrocene- and acylgermane-containing photoinitiator systems. WO 2017/021785 A1 discloses the possibility that such adhesive compositions could further contain silica as a thixotropic agent and non-soluble fillers such as certain polymer-based fillers that have the effect of conveying thickness or "body" to the formulation and that, if used, are usually present in amounts of between 2% and 4% by weight of the composition. There is no disclosure of the possibility of preparing composite materials containing high loadings of filler, in particular opaque and/or fibrous fillers.

SUMMARY OF THE INVENTION

According to certain embodiments of the invention, light-curable composition useful for forming composite materials are provided. Such light-curable compositions may comprise, consist essentially of, or consist of:
  a) a photoinitiator system comprising, consisting essentially of or consisting of at least one of i) a combination of at least one metallocene compound comprising, consisting essentially of or consisting of a transition metal of Group VIII of the periodic table (in particular, Fe, Os, or Ru) and aromatic electron system ligands and at least one photocleavable compound which generates an acyl radical when exposed to light or ii) a photocleavable metallocene compound comprising, consisting essentially of or consisting of a transition metal of Group VIII of the periodic table and aromatic electron system ligands which generates an acyl radical when exposed to light;
  b) at least one cyanoacrylate; and
  c) at least 10% by weight, based on total weight of the light-curable composition, of at least one filler (in particular, at least one opaque filler, such as carbon fiber).

The portion of the light-curable composition other than filler (i.e., the admixture of a) and b) as stated above, plus optionally one or more further additives other than filler as described hereafter) may be referred to herein as the "light-curable resin component" of the light-curable composition.

As used herein, the term "light-curable" refers to a substance or composition which is capable of being cured by exposure to light, wherein light may be any form of actinic radiation including ultraviolet (UV) light, visible light, near infrared light, and electron beam radiation.

Despite their comparatively high loading of filler, the compositions of the present invention may be readily cured by exposing the compositions to light (e.g., ultraviolet or visible light), thereby producing composite materials containing a cured polymeric matrix derived from the one or more cyanoacrylates and other reactive species which may optionally be present in the light-curable composition. The curing is effected by light and may initially be partial or complete; however, any residual monomer will continue to cure naturally when in prolonged contact with high loadings of filler even in the dark. The present invention thus enables the production of articles containing such composite materials, wherein the composite materials are cured throughout their entire depth or thickness even though the filler may block light from fully penetrating such depth or thickness. If the filler is discontinuous (e.g., in the form of a plurality of particles or fibers that are separated from each other), there may be regions within the uncured light-curable composition in which portions of the light-curable resin component are completely shielded from light due to the presence of the filler. Despite such shielding, full and complete curing of such regions is possible even if the light-curable composition is exposed to light from only one direction. Moreover, the present invention makes possible the efficient production of cured composite articles which are relatively thick, e.g., articles having a thickness of at least 1, at least 2, at least 3, at least 4 or at least 5 mm, although thin (e.g., 10 to 500 microns thick) composite films and coatings can also be prepared using light-curable compositions in accordance with the invention.

The presence of the filler helps to enhance the mechanical properties of the cured composite material as compared to those obtained in the absence of filler. The present invention thus makes possible, for example, the efficient production of filler-reinforced composites (e.g., fiber-reinforced composites) useful as components of aircraft (aerospace applications), vehicles, containers, buildings (e.g., construction materials), sporting goods, furniture, appliances and the like.

DETAILED DESCRIPTION OF EMBODIMENTS OF THE INVENTION

Photoinitiator System

The photoinitiator system utilized in the present invention comprises, consists essentially of or consists of at least one of i) a combination of at least one metallocene compound comprising, consisting essentially of or consisting of a transition metal of Group VIII of the periodic table (especially Fe, Os, or Ru) and aromatic electron system ligands and at least one photocleavable compound which generates an acyl radical when exposed to light or ii) a photocleavable metallocene compound comprising, consisting essentially of or consisting of a transition metal of Group VIII of the periodic table and aromatic electron system ligands which generates an acyl radical when exposed to light.

Metallocene Compound

Preferred metallocene compounds for use in the present invention include metallocene compounds in which each of the aromatic electron system ligands in the metallocene compound is a π-arene, indenyl, or η-cyclopentadienyl ligand.

According to other preferred embodiments, the metallocene compound comprises a transition metal selected from the group consisting of iron, osmium, and ruthenium. Iron-containing metallocenes, i.e., ferrocenes, are employed in certain aspects of the invention. However, in other embodiments, the metallocene compound may be an osmocene or a ruthenocene. Combinations of two or more different metallocene compounds may be used.

The photoinitiator system may, for example, comprise at least one metallocene compound of formula (V):

(V)

wherein M represents a transition metal of Group VIII of the periodic table (e.g., Fe, Os, Ru); R represents a halogen atom, a hydrocarbon group having 1 to 20 carbon atoms (preferably 1 to 5 carbon atoms if the hydrocarbon group is an alkyl group; and 'a' is an integer of 0 or 1.

In other embodiments, the photoinitiator system is comprised of at least one ferrocene compound of formula (I):

(I)

wherein $R^1$ is hydrogen or $C_1$-$C_4$ alkyl (e.g., methyl, ethyl, propyl, butyl, straight chain or branched), each $R^1$ group being the same or different.

Examples of some of the particular metallocene compounds useful in the present invention include the metallocenes disclosed in U.S. Pat. No. 6,503,959, which is incorporated herein by reference in its entirety for all purposes.

The concentration of metallocene compound in the light-curable compositions of the present may be varied as desired depending upon the particular metallocene compound(s) selected, the type or types of polymerizable compound(s) present in the light-curable composition, the type(s) and concentration(s) of photocleavable compound(s) also present in the light-curable composition, the curing conditions utilized, and the rate of curing desired, among other possible factors. Typically, however, the light-curable composition is comprised of from 100 to 1000 ppm by weight in total of metallocene compound(s) based on the weight of the light-curable composition.

Photocleavable Compound

Photoinitiator systems used in the present invention also include at least one photocleavable compound which generates an acyl radical when exposed to light. According to preferred embodiments, the at least one photocleavable compound generates a benzoyl radical when exposed to light (the benzene ring of such benzoyl radical may be substituted or unsubstituted). According to one embodiment of the invention, such photocleavable compound is a non-metallocene compound which is used in combination with a metallocene compound. According to another embodiment, however, a photocleavable metallocene compound which itself is capable of generating an acyl radical (RC●(=O), with R being an organic group such as an alkyl group or, preferably, an aromatic group and ● representing an unpaired electron on the carbon atom) when exposed to light is utilized, as will be explained in more detail subsequently.

In instances where the light-curable composition contains an acid stabilizer (which, as will be later explained, is often desirable to use where the light-curable composition contains curable species such as cyanoacrylates which have insufficient storage stability in the absence of an acid stabilizer), it will generally be advantageous to employ a photocleavable compound which is acid resistant (i.e., which has a reduced tendency to degrade when stored over a period of time in the presence of acid). For this reason, acygermane compounds are typically preferred over acylphosphine oxide compounds.

According to a preferred embodiment of the invention, the photocleavable compound is an acylgermane compound. Such compounds are characterized by containing a germanium (Ge) atom substituted by at least one acyl group. In particular, the acyl group may be an aromatic acyl group. The aromatic acyl group may, for example, correspond to the structure —C(=O)R, wherein R is a benzene ring, which may be unsubstituted or which may be substituted with one or more substituents other than hydrogen such as an alkoxy (e.g., methoxy) group, an alkyl group, or a halo group. The other substituents bonded to the germanium atom may be, for example, alkyl groups (e.g., methyl, ethyl, propyl) and/or aryl groups (e.g., phenyl or substituted phenyl).

Acylgermane photoinitiators are well known in the art and any of such compounds may be employed in the present invention. Suitable photocleavable acylgermane compounds are described, for example, in the following documents, the disclosures of each of which are incorporated herein by reference in their entireties for all purposes: US Pat. Pub. No. 2018/0265527; US Pat. Pub. No. 2016/0357031; US Pat. Pub. No. 2017/0275414; U.S. Pat. No. 7,605,190; Radebner et al., "Novel Germanium-Based Photoinitiators for Radical Polymerization," RadTech 2017; and Haas et al., "Recent Advances in Germanium-Based Photoinitiator Chemistry," Chemistry, 12 Jun. 2018, 24 (33), pp. 8258-8267.

The photoinitiator system may, for example, comprise at least one acylgermane compound in accordance with Formula (IX):

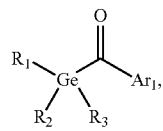

(IX)

wherein $Ar_1$ is an aromatic group, either unsubstituted or further substituted in any position by one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups, and in which $R_1$, $R_2$, and $R_3$ independently may be an acyl, aryl, alkyl, or carbonyl group, either unsubstituted or further substituted with one or more alkyl radicals, ethers, sulfides, silyl groups, halogens, carboxyl groups, vinyl groups, additional aromatic or heterocyclic groups, alkyl radicals, or aromatic or heterocyclic groups interrupted by one or more ether, sulfide, silyl, carboxyl, or vinyl groups.

According to certain embodiments, at least one acylgermane compound is present in the photoinitiator system which is in accordance with Formula (IX) and satisfies one of the following conditions: (a) each of $R_1$-$R_3$ is an aryl-substituted or aromatic acyl group; (b) if exactly two of $R_1$-$R_3$ are an aryl-substituted or aromatic acyl group, the remaining substituted groups are a $C_1$-$C_{10}$ alkyl; (c) if exactly one of $R_1$-$R_3$ is an aryl-substituted or aromatic acyl group, the remaining two substituted groups are a $C_1$-$C_{10}$ alkyl; or (d) each of $R_1$-$R_3$ is a $C_1$-$C_{10}$ alkyl.

In one embodiment of the invention, the photoinitiator system includes at least one acylgermane compound corresponding to Formula (II):

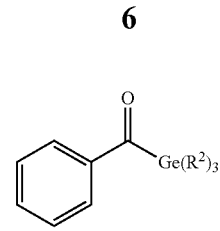

(II)

wherein $R^2$ is alkyl (e.g., methyl) or aryl (e.g., phenyl). The $R^2$ groups may be the same as or different from each other.

In another embodiment of the invention, the photoinitiator system includes at least one acylgermane compound corresponding to Formula (III):

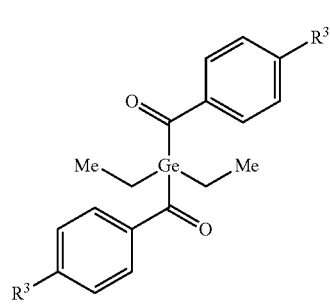

(III)

wherein $R^3$ is hydrogen or alkoxy (e.g., methoxy).

In other embodiments of the invention, the photoinitiator system includes at least one photocleavable compound which is an acylphosphine oxide. Monoacylphosphine oxides, bisacylphosphine oxides or any of the acylphosphine oxide photoinitiators known in the art may be used.

For example, an acylphosphine oxide compound in accordance with Formula (X) may be utilized:

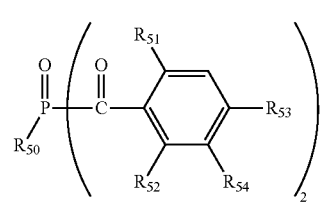

(X)

wherein $R_{50}$ is $C_1$-$C_{12}$ alkyl, cyclohexyl or phenyl which is unsubstituted or is substituted by 1 to 4 halogen or $C_1$-$C_8$ alkyl; $R_{51}$ and $R_{52}$ are each independently of the other $C_1$-$C_8$ alkyl or $C_1$-$C_8$ alkoxy; $R_{53}$ is hydrogen or $C_1$-$C_8$ alkyl; and $R_{54}$ is hydrogen or methyl. For example, an acylphosphine oxide in accordance with Formula (X) may be employed in which $R_{50}$ is $C_2$-$C_{10}$ alkyl, cyclohexyl or phenyl which is unsubstituted or is substituted by 1 to 4 $C_1$-$C_4$ alkyl, Cl or Br.

According to other embodiments, the photoinitiator system may include at least one acylphosphine oxide compound in accordance with Formula (XI):

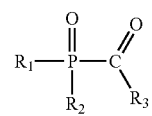

(XI)

wherein $R_1$ and $R_2$ independently of one another are $C_1$-$C_{12}$ alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$; $R_3$ is phenyl which is unsubstituted or substituted from one to four times by $C_1$-$C_8$ alkyl, $C_1$-$C_8$ alkoxy, $C_1$-$C_8$ alkylthio and/or halogen; and $R_4$ is $C_1$-$C_8$ alkyl, phenyl or benzyl.

Specific examples of suitable acylphosphine oxides include, but are not limited to, 2,4,6-trimethylbenzoyl-diphenyl-phosphine oxide, bis(2,4,6-trimethylbenzoyl)-phenyl phosphine oxide, bis(2,4,6-trimethylbenzoyl)-(2,4-bis-pentyloxyphenyl)phosphine oxide, and 2,4,6-trimethylbenzoylethoxyphenylphosphine oxide and combinations thereof.

The concentration of photocleavable compound in the light-curable compositions of the present may be varied as desired depending upon the particular photocleavable compound(s) selected, the type or types of polymerizable compound(s) present in the light-curable composition, the type(s) and concentration(s) of metallocene compound(s) also present in the light-curable composition, the curing conditions utilized, and the rate of curing desired, among other possible factors. Typically, however, the light-curable composition is comprised of from 500 to 10,000 ppm by weight in total of photocleavable compound(s) based on the weight of the light-curable composition.

According to certain embodiments of the invention, the photoinitiator system includes a photocleavable metallocene compound comprising a transition metal of Group VIII of the periodic table and aromatic electron system ligands which generates an acyl radical when exposed to light. The transition metal may be, for example, iron (Fe), osmium (Os), or ruthenium (Ru). One or more of the aromatic electron system ligands may be substituted with a group capable of cleaving when exposed to light to generate an acyl radical. For example, the acyl radical may have the general structure L-C·(=O) where L is a ligand residue (such as an η-cyclopentadienyl ligand) and · is an unpaired electron on the carbon atom. Prior to photocleavage, the group substituted on the ligand may correspond to the structure —C(=O)—Ge($R_b$)$_3$ or —C(=O)—P(=O)($R_c$)$_2$, wherein each $R_b$ and $R_c$ is the same or different and may be an alkyl (e.g., methyl, ethyl) group or an aryl (e.g., phenyl) group (wherein the alkyl or aryl group may be substituted).

For example, in one embodiment the photoinitiator system is comprised of a photocleavable metallocene compound corresponding to Formula (IV):

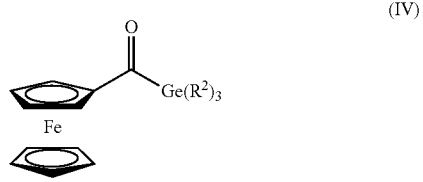

(IV)

wherein $R^2$ is methyl or phenyl. Generally speaking, if the photoinitiator system includes a photocleavable metallocene compound, such compound may typically and suitably be present at a concentration of 100 to 2000 ppm by weight based on the total weight of the light-curable composition.

In addition to the above-mentioned metallocene compounds, photocleavable compounds which generate acyl radicals when exposed to light, and/or photocleavable metallocene compounds which generate acyl radicals when exposed to light, the photoinitiator system may optionally be comprised of one or more additional components which help to promote or cause the desired curing reaction when the light-curable composition is exposed to light. In particular, one or more radical photoinitiators which generate radical species other than acyl radicals when exposed to light may be present as part of the photoinitiator systems. Illustrative examples of such optional additional radical photoinitiators include benzoin ethers, dialkoxy acetophenone, benzoin, methylphenyl glyoxylate, benzyl dimethyl ketal, 1-hydroxycyclohexyl phenyl ketone, substituted benzophenones and the like.

Cyanoacrylates

The light-curable compositions of the present invention comprise one or more light-curable monomers, in particular one or more light-curable cyanoacrylates. For example, the light-curable monomer component of the light-curable composition may consist only of one or more cyanoacrylates (that is, the only light-curable compounds present are cyanoacrylates). In addition to one or more cyanoacrylates, the light-curable composition may comprise one or more auxiliary light-curable compounds such as (meth)acrylate-functionalized compounds as discussed in more detail below.

As used herein, the term "cyanoacrylate" refers to an organic compound which contains a carbon-carbon double bond, wherein one carbon atom involved in the carbon-carbon double bond is substituted with a cyano (—CN) group and an ester group.

In certain embodiments, the light-curable composition comprises at least one cyanoacrylate of formula (VI):

(VI)

wherein:

A is CN; and

D is a carboxylic ester moiety $CO_2R^4$, wherein $R^4$ is selected from the group consisting of: $C_1$-$C_{18}$ linear and branched alkyl chains; terminally trimethylsilylated $C_1$-$C_3$ alkyl chains; —$CH_2CF_3$; —$CH_2CF_2CF_3$; —$CH_2(CF_2)_2H$; —$CH_2(CF_2)_4H$; —$CH(CF_3)CH_3$; allyl; propargyl; cyclohexyl; cyclohexenyl; methylcyclohexyl; methylcyclohexenyl; ethylcyclohexyl; ethylcyclohexenyl; furfuryl; phenylethyl; phenoxyethyl; an acrylic ester moiety of formula (VII):

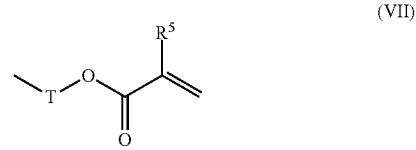

(VII)

wherein

T is: $(CH_2)_z$, wherein the value of z is between 2 and 12 inclusive, a $C_3$-$C_{12}$ branched alkylene chain; cyclohexyl;

bisphenyl, bisphenol, and $R^5$ is H, Me, CN or $CO_2R^6$, wherein $R^6$ is a methyl or ethyl group;

a group of formula (VIII)

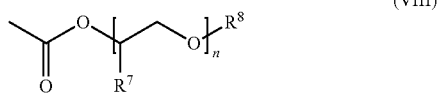

(VIII)

wherein $R^7$ is selected from the group consisting of H and Me, $R^8$ is selected from the group consisting of $Si(Me_3)_3$ and $C_1$-$C_6$ linear and branched alkyl chains, and the value of n is from 1 to 3 inclusive.

When $R^5$ is H or Me in formula (VI) then the ester group D of structure (VI) comprises an acrylate or methacrylate respectively and (VI) is then a compound with two "mixed" or "hybrid" functional groups (cyanoacrylate and acrylic).

When $R^5$ is CN in (VI), then (VI) is a bis-cyanoacrylate. Preferred examples of cyanoacrylate esters with acrylic ester moieties, showing a hybrid or bis nature, include acryloylethyl cyanoacrylate, methacryloyldodecyl cyanoacrylate and 1,6-hexyl biscyanoacrylate.

The esters of general formula (VII) can be defined generically as alkoxyalkyl or alkylsilyloxyalkyl esters, among which the following can be preferentially mentioned: 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl, trimethylsilyloxyethyl, hexamethyldisiloxanoxyethyl, among others. Other examples of alkoxyalkyl type monomers are described in U.S. Pat. No. 6,977,278. The alkoxylalkyl cyanoacrylates are generally low in odor and are non-staining and non-irritating. In certain preferred embodiments $R^7$ is H and $R^8$ is Me or Et and n is 1. Thus, in a preferred embodiment, the compound of general formula (VI) is 2-methoxyethyl cyanoacrylate or 2-ethoxyethyl cyanoacrylate. In another preferred embodiment, $R^7$ is Me, $R^8$ is Me, and n is 1. Thus, the compound of general formula (VI) may be 2-(1-methoxy)propyl cyanoacrylate.

Additional examples of suitable cyanoacrylates include, but are not limited to, alkyl and cycloalkyl α-cyanoacrylates such as methyl α-cyanoacrylate, ethyl α-cyanoacrylate, propyl α-cyanoacrylate, butyl α-cyanoacrylate, and cyclohexyl α-cyanoacrylate; alkenyl and cycloalkenyl α-cyanoacrylates such as allyl α-cyanoacrylate, methallyl α-cyanoacrylate, and cyclohexenyl α-cyanoacrylate; alkynyl α-cyanoacrylates such as propargyl α-cyanoacrylate; aryl α-cyanoacrylates such as phenyl α-cyanoacrylate and tolyl α-cyanoacrylate; heteroatom-containing α-cyanoacrylates such as methoxyethyl α-cyanoacrylate, ethoxyethyl α-cyanoacrylate, and furfuryl α-cyanoacrylate; and silicon-containing α-cyanoacrylates such as trimethylsilylmethyl α-cyanoacrylate, trimethylsilylethyl α-cyanoacrylate, trimethylsilylpropyl α-cyanoacrylate, and dimethylvinylsilylmethyl α-cyanoacrylate.

The cyanoacrylate monomers defined by structure (VI) may be solid or liquid in physical form under normal ambient conditions, and may have functions that enable copolymerisation and crosslinking. Solid monomers may be dissolved in liquid monomers to yield liquid formulations. In the context of the invention, within the monomers which are substantially odor-free or of low odour, are also included those monomers which are not lachrymatory, and those whose vapors tend not polymerize under ambient conditions to produce white deposits on the substrates to be bonded. These features are associated with low vapor pressures. Thus, for example, when $R^4$ in the compound of general formula (VI) is 2-ethylhexyl, furfuryl, cyclohexyl, cyclohexenyl, terminally trialkylsilylmethyl ($C_1$-$C_3$ alkyl), or acryloylethyl cyanoacrylate, methacryloyldodecyl cyanoacrylate and 1,6-hexyl biscyanoacrylate the monomer is substantially odor-free or low odor in addition to the well-known alkoxyalkyl types. Monomers of structure (VI) bearing carboxylic esters further comprising structure (VII) have second polymerizable or copolymerizable functional groups and are thus considered to have dual or "mixed or hybrid" functionality, meaning more than one functional group is present, e.g., two CA groups in one molecule of structure (VI), or one CA functional group combined with one acrylic functional group in one molecule.

When at least one cyanoacrylate monomer of structure (VI) is present, then combinations of two or more cyanoacrylate monomers of structure (VI) may be formulated according to particular needs in end use applications. For example, odor-free and stain-free cyanoacrylates may be selected from the alkoxyalkyl CA class or may be selected from non-alkoxyalkyl CAs mentioned in the preceding discussion. Alkoxyalkyl CAs are of a more hydrophilic nature, whereas 2-ethylhexyl CA, or terminally substituted trialkylsilylmethyl CAs are of a more hydrophobic nature. Mixtures of both classes thus allow adjustment of hydrophilicity-hydrophobicity while still producing an odor free formulation. Similarly, mixtures of butyl CA and 2-octyl CA allow adjustment of flexibility of the final cured adhesive by modulating the glass transition temperature of the copolymer formed. Furthermore, mixtures of alkoxyalkyl CAs, or even ECA, with bis-CAs lead to crosslinked copolymers by virtue of the dual functionality of the included bis-CAs, and the same will apply to mixtures of any CA with CAs with hybrid CA-acrylic functional groups. Mixtures of CAs, bis-CAs and hybrid CAs also give rise to copolymers with crosslinked structures. Mixed formulations also allow for optimizing cost-benefits in formulation depending on needs, for example if inexpensive ECA is acceptable to use, but increased durability is required over what is offered by polyECA, then a more sophisticated CA-acrylic hybrid or bis-CA may be included at relatively low concentration, typically less than 10%, to beneficially transform the properties of polyECA by copolymerisation and crosslinking, without adding excessive cost. It will be understood that the types of mixtures and the relative concentrations of each CA monomer can be regulated to suit the needs of the particular formulation for particular application.

According to certain embodiments, the light-curable resin component of the light-curable composition comprises, consists essentially of or consists of at least one cyanoacrylate represented by the structure $H_2C=C(CN)-CO_2R$, where R is selected from $C_{1-15}$ alkyl, alkoxyalkyl, cycloalkyl, alkenyl, aralkyl, aryl, allyl and haloalkyl groups. Desirably, the cyanoacrylate monomer may be selected from methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate, methoxyisopropyl-2-cyanoacrylate and combinations thereof.

In one embodiment, the cyanoacrylate may represent at least 50%, or at least 60%, or at least 70%, or at least 80%, or at least 90% or 100% of the total weight of the curable compounds of the light-curable composition. The curable compounds of the light-curable composition are cyanoacrylates and any other ethylenically unsaturated compounds such as (meth)acrylate functionalized compounds.

The light-curable composition may comprise at least 5%, at least 10%, at least 15%, at least 20%, at least 25%, at least 30%, at least 35%, at least 40%, at least 45% or at least 50% by weight of cyanoacrylate based on the weight of the light-curable composition. The light-curable composition may comprise less than 95%, less than 90%, less than 85%, less than 80%, less than 75%, less than 70%, less than 65%, less than 60%, less than 55% or less than 50%, by weight of cyanoacrylate based on the weight of the light-curable composition. In one embodiment, the light-curable composition may comprise 5 to 95%, 10 to 90%, 15 to 85%, 20 to 80%, 25 to 75% or 30 to 70%, by weight of cyanoacrylate based on the weight of the light-curable composition.

Filler

The light-curable compositions of the present invention comprise at least 10% by weight of at least one filler, based on the total weight of the light-curable composition. More highly filled light-curable compositions are also within the scope of the present invention. For example, the light-curable composition may be comprised of at least 15%, at least 20%, at least 25%, at least 30%, at least 35%, at least 40%, at least 45% or at least 50% by weight of one or more fillers (i.e., the total filler content of the light-curable composition may be at least 10% by weight, at least 15% by weight, at least 20% by weight, etc.). The light-curable composition may comprise less than 95%, less than 90%, less than 85%, less than 80%, less than 75%, less than 70%, less than 65%, less than 60%, less than 55% or less than 50%, by weight of filler based on the weight of the light-curable composition. In one embodiment, the light-curable composition may comprise 10 to 95%, 15 to 90%, 20 to 85%, 25 to 80%, 30 to 75% or 35 to 70%, by weight of filler based on the weight of the light-curable composition.

According to preferred embodiments, the light-curable composition comprises at least one filler which is an opaque filler (meaning that as formulated in the light-curable composition, the filler is opaque, i.e., impervious to rays of light, in particular impervious to UV and visible light rays). The light-curable composition may comprise, for example, at least 10%, at least 15%, at least 20%, at least 25%, at least 30%, at least 35%, at least 40%, at least 45% or at least 50% by weight of one or more opaque fillers (i.e., the total opaque filler content of the light-curable composition may be at least 10% by weight, at least 15% by weight, at least 20% by weight, etc.). One or more opaque fillers may be employed in combination with one or more non-opaque fillers.

In preferred embodiments of the invention, the light-curable composition comprises at least one filler, in particular at least one opaque filler, which is insoluble in the other components of the light-curable composition. In particular, such filler does not dissolve in the light-curable monomer component of the light-curable composition, wherein the light-curable monomer component is the at least one cyanoacrylate plus any other light-curable compounds other than cyanoacrylates (such as (meth)acrylate-functionalized compounds). Typically, such light-curable monomer component is a liquid at room temperature (25° C.). In one embodiment, the filler may be insoluble in the other components of the light-curable composition at room temperature (25° C.). In one embodiment, the filler may be insoluble in the other components of the light-curable composition throughout a temperature range of 25° C. to 100° C. In one embodiment, the filler may be at least partly soluble in the other components of the light-curable composition when heated at a temperature of at least 30° C., at least 40° C., at least 50° C. or at least 60° C. Further, it is preferred that at least one filler is insoluble in the solid resin matrix formed by curing the light-curable resin component. The use of one or more fillers which are insoluble in the cured resin matrix makes possible the production of composite materials from the light-curable compositions of the present invention.

The filler or fillers may be of any suitable shape or form. For example, the filler may take the form of powder, beads, microspheres, particles, granules, wires, fibers or combinations thereof. If in particulate form, the particles may be spheroid, flat, irregular or elongated in shape. High aspect particulate fillers may be utilized, for example. Hollow as well as solid fillers are useful in the present invention.

According to various embodiments of the invention, the filler may have an aspect ratio (i.e., the ratio of the length of an individual filler element, such as a particle or fiber, to the width of that individual filler element) of 1:1 or higher, e.g., greater than 1:1, at least 2:1, at least 3:1, at least 5:1, at least 10:1, at least 100:1, at least 1000:1; at least 10,000:1, at least 100,000:1, at least 500,000:1, at least 1,000,000:1 or even higher (i.e., effectively an infinite aspect ratio). According to other embodiments, the filler may have an aspect ratio not more than 2:1, not more than 3:1, not more than 5:1, not more than 10:1, not more than 100:1, not more than 1000:1; not more than 10,000:1, not more than 100,000:1, not more than 500,000:1, or not more than 1,000,000:1

The surface of the filler may be modified in accordance with any of the methods or techniques known in the art. Such surface treatment methods include, without limitation, sizing (e.g., coating with one or more organic substances), silylation, oxidation, functionalization, neutralization, acidication, other chemical modifications and the like and combinations thereof.

The chemical nature of the filler may be varied and selected as may be desired in order to impart certain properties or characteristics to the product obtained upon curing the light-curable composition. For example, the filler may be inorganic or organic in character. Mixed organic/inorganic fillers may also be used. Carbon-based fillers (e.g., carbon fibers, carbon black, carbon nanotubes) as well as mineral fillers can be employed.

Generally speaking, it will be preferred (especially where the light-curable composition is to be stored for some period of time after formulation) to avoid the use of fillers which are basic in character, as the presence of such fillers in the light-curable composition may result in instability of the light-curable composition or lead to immediate (premature) curing of the light-curable composition. Thus, in certain embodiments of the invention, the filler or fillers utilized are non-basic (i.e., neutral or acidic) fillers.

One or more fibrous fillers (i.e., fillers in the form of fibers) may be utilized in especially preferred embodiments of the invention. Suitable exemplary fibrous fillers include carbon fibers (sometimes referred to as graphite fibers), glass fibers, silicon carbide fillers, boron fibers, alumina fibers, polymeric fibers (e.g., aramide fibers), metal fibers, natural fibers (such as fibers derived from plant sources), basalt fibers, and combinations thereof. The fiber may be of natural or synthetic origin. Any of the following types of fiber can be used: short fibers (<10 mm in length), chopped fibers, long fibers (at least 10 mm in length), continuous fibers, woven continuous fibers, nonwoven continuous fibers, mats of woven fibers, mats of nonwoven fibers (e.g., random fiber mats), biaxial mats, unidirectional mats, continuous strands, unidirectional fibers, fiber tows, fiber fabrics, braided fibers, knitted fibers and the like and combinations thereof. Typically, suitable fibers will have a diameter of from about 2 to about 20 microns, e.g., from about 5 to about 10 microns.

Hollow as well as solid fibers can be used; the fibers may be circular or irregular in cross-section.

Examples of other types of fillers which may be used in the light-curable compositions of the present invention include clays (including organically modified clays and nanoclays), bentonite, silicates (e.g., magnesium silicates, talc, calcium silicates, wollastonite), metal oxides (e.g., zinc oxide, titanium dioxide, alumina), carbonates (e.g., calcium carbonate), mica, zeolites, talc, sulfates (e.g., calcium sulfate), and the like and combinations thereof.

In one embodiment, the light-curable composition comprises a relatively high loading of one or more fillers that are not opaque but which are capable of scattering rays of light to which the light-curable composition is exposed. For example, light scattering may occur where the refractive index of the filler is dissimilar to the refractive index of the portion of the light-curable composition which does not include the filler (which typically, prior to curing, is a liquid comprised of light-curable compounds, the photoinitiator system and possibly other non-filler additives). Such fillers may include, for example, glass fillers (e.g., glass fibers) and fillers comprised of transparent polymers. In such an embodiment, the light-curable composition may comprise at least 20%, at least 30% or at least 40% by weight, based on the total weight of the light-curable composition, of such light-scattering filler(s).

Due to the light scattering that may occur in these non-opaque filled systems, the degree of cure achieved with conventional photo-initiated free radical polymerization methods would be expected to decrease with progressing depth into the cured article, and, depending on the thickness of the article, decreasing to the point at which there is no curing or negligible curing of the resin material. In such cases, the use of the current invention can provide both greater depth of cure, as well as a greater degree of cure overall throughout the thickness of the part, than conventional curing methods.

Auxiliary Curable Compounds

Optionally, light-curable compositions in accordance with the present invention may additionally comprise one or more curable compounds which are not classifiable as cyanoacrylates. Such compounds, which may be referred to herein as auxiliary curable compounds, are compounds containing one or more functional groups per molecule that are capable of participating in curing or polymerization reactions with the cyanoacrylate(s) when the light-curable composition is cured. In particular, such auxiliary curable compounds may contain one or more ethylenically unsaturated functional groups, such as vinyl functional groups and (meth)acrylate functional groups. As used here, the term "(meth)acrylate" includes both acrylate and methacrylate. Such auxiliary curable compounds may, in certain embodiments of the invention, be present in a total amount of 0.5 to 100 parts by weight, or 1 to 50 parts by weight, or 5 to 40 parts by weight, or 10 to 35 parts by weight, or 20 to 30 parts by weight, per 100 parts by weight in total of cyanoacrylates.

Generally speaking, it will be preferred (especially where the light-curable composition is to be stored for some period of time after formulation) to avoid the use of auxiliary curable compounds which are nucleophilic in character, as the presence of such compounds in the light-curable composition may result in instability of the light-curable composition or lead to immediate (premature) curing of the light-curable composition. Thus, in certain embodiments of the invention, the auxiliary curable compound(s) utilized is or are non-nucleophilic (do not contain any nucleophilic functional groups).

According to certain embodiments, the light-curable composition comprises one or more (meth)acrylate-functionalized compounds in combination with one or more cyanoacrylates. (Meth)acrylate-functionalized compounds useful as auxiliary curable compounds include monomeric as well as oligomeric (meth)acrylate compounds; mono(meth)acrylate-functionalized compounds and also poly(meth)acrylate-functionalized compounds (e.g., di-, tri- and tetra(meth)acrylate-functionalized compounds) can be used.

Such (meth)acrylate functionalized compounds may, in certain embodiments of the invention, be present in a total amount of 0.5 to 100 parts by weight, or 1 to 50 parts by weight, or 5 to 40 parts by weight, or 10 to 35 parts by weight, or 20 to 30 parts by weight, per 100 parts by weight in total of cyanoacrylates.

Any of the following types of (meth)acrylate-functionalized compounds may, for example, be employed in the light-curable compositions of the present invention, in combination with one or more cyanoacrylates: monomers such as (meth)acrylate esters of aliphatic mono-alcohols, (meth)acrylate esters of alkoxylated aliphatic mono-alcohols, (meth)acrylate esters of aliphatic polyols, (meth)acrylate esters of alkoxylated aliphatic polyols, (meth)acrylate esters of aromatic ring-containing alcohols, and (meth)acrylate esters of alkoxylated aromatic ring-containing alcohols; and oligomers such as epoxy (meth)acrylates, polyether (meth)acrylates, urethane (meth)acrylates, polyester (meth)acrylates (including amine- and sulfide-modified derivatives thereof); and combinations thereof.

Suitable (meth)acrylate-functionalized oligomers include, for example, polyester (meth)acrylates, polycarbonate (meth)acrylates, epoxy (meth)acrylates, polyether (meth)acrylates, urethane (meth)acrylates (sometimes also referred to as polyurethane (meth)acrylates or urethane (meth)acrylate oligomers) and combinations thereof, as well as amine-modified and sulfide-modified variations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxy functional components (in particular, diols) and polycarboxylic acid functional compounds (in particular, dicarboxylic acids and anhydrides). To prepare the polyester (meth)acrylates, the hydroxyl groups of the polyester polyols are then partially or fully esterified by reacting with (meth)acrylic acid, (meth)acryloyl chloride, (meth)acrylic anhydride or the like. Polyester (meth)acrylates may also be synthesized by reacting a hydroxyl-containing (meth)acrylate such as a hydroxyalkyl (meth)acrylate (e.g., hydroxyethyl acrylate) with a polycarboxylic acid. The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Exemplary polyether (meth)acrylate oligomers include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of epoxides and other oxygen-containing heterocyclic compounds (e.g., ethylene oxide, 1,2-propylene oxide, butene oxide, tetrahydrofuran and combinations thereof) with a starter molecule. Suitable starter molecules include water, hydroxyl functional materials, polyester polyols and amines. Polyetherols may also be obtained by the condensation of diols such as glycols.

Urethane (meth)acrylates (sometimes also referred to as "polyurethane (meth)acrylates") capable of being used in the curable compositions of the present invention include urethanes based on aliphatic and/or aromatic polyester polyols, polyether polyols and polycarbonate polyols and aliphatic and/or aromatic polyester diisocyanates and polyether diisocyanates capped with (meth)acrylate end-groups.

In various embodiments, the urethane (meth)acrylates may be prepared by reacting aliphatic and/or aromatic polyisocyanates (e.g., diisocyanates, triisocyanates) with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl (meth)acrylate or hydroxypropyl (meth)acrylate to provide terminal (meth)acrylate groups. For example, the urethane (meth)acrylates may contain two, three, four or more (meth)acrylate functional groups per molecule. Other orders of addition may also be practiced to prepare the polyurethane (meth)acrylate, as is known in the art. For example, the hydroxyl-functionalized (meth)acrylate may be first reacted with a polyisocyanate to obtain an isocyanate-functionalized (meth)acrylate, which may then be reacted with an OH group terminated polyester polyol, polyether polyol, polycarbonate polyol, polycaprolactone polyol, polydimethysiloxane polyol, polybutadiene polyol, or a combination thereof. In yet another embodiment, a polyisocyanate may be first reacted with a polyol, including any of the aforementioned types of polyols, to obtain an isocyanate-functionalized polyol, which is thereafter reacted with a hydroxyl-functionalized (meth)acrylate to yield a polyurethane (meth)acrylate. Alternatively, all the components may be combined and reacted at the same time.

Any of the above-mentioned types of oligomers may be modified with amines or sulfides (e.g., thiols), following procedures known in the art. Such amine- and sulfide-modified oligomers may be prepared, for example, by reacting a relatively small portion (e.g., 2-15%) of the (meth)acrylate functional groups present in the base oligomer with an amine (e.g., a secondary amine) or a sulfide (e.g., a thiol), wherein the modifying compound adds to the carbon-carbon double bond of the (meth)acrylate in a Michael addition reaction.

Illustrative examples of suitable monomeric (meth)acrylate-functionalized compounds include (meth)acrylated mono- and polyols (polyalcohols) and (meth)acrylated alkoxylated mono-alcohols and polyols. The mono-alcohols and polyols may be aliphatic (including one or more cycloaliphatic rings) or may contain one or more aromatic rings (as in the case of phenol or bisphenol A). "Alkoxylated" means that the base mono-alcohol or polyol has been reacted with one or more epoxides such as ethylene oxide and/or propylene oxide so as to introduce one or more ether moieties (e.g., —$CH_2CH_2$—O—) onto one or more hydroxyl groups of the mono-alcohol or polyol, prior to esterification to introduce one or more (meth)acrylate functional groups. For example, the amount of epoxide reacted with the mono-alcohol or polyol may be from about 1 to about 30 moles of epoxide per mole of mono-alcohol or polyol. Examples of suitable mono-alcohols include, but are not limited to, straight chain, branched and cyclic C1-C54 mono-alcohols (which may be primary, secondary or tertiary alcohols). For instance, the mono-alcohol may be a C1-C7 aliphatic mono-alcohol. In another embodiment, the mono-alcohol may be a C8-C24 aliphatic mono-alcohol (e.g., lauryl alcohol, stearyl alcohol). Examples of suitable polyols include organic compounds containing two, three, four or more hydroxyl groups per molecule such as glycols (diols), e.g., ethylene glycol, 1,2- or 1,3-propylene glycol, or 1,2-, 1,3- or 1,4-butylene glycol, neopentyl glycol, trimethylolpropane, triethylolpropane, pentaerythritol, glycerol and the like.

Representative, but not limiting, examples of suitable monomeric (meth)acrylate-functionalized compounds include: 1,3-butylene glycol di(meth)acrylate, 1,4-butanediol di(meth)acrylate, 1,6-hexanediol di(meth)acrylate, longer chain aliphatic di(meth)acrylates (such as those generally corresponding to the formula $H_2C=CRC(=O)$—O—$(CH_2)_m$—O—$C(=O)CR'=CH_2$, wherein R and R' are independently H or methyl and m is an integer of 8 to 24), alkoxylated (e.g., ethoxylated, propoxylated) hexanediol di(meth)acrylates, alkoxylated (e.g., ethoxylated, propoxylated) neopentyl glycol di(meth)acrylates, dodecyl di(meth)acrylates, cyclohexane dimethanol di(meth)acrylates, diethylene glycol di(meth)acrylates, dipropylene glycol di(meth)acrylates, alkoxylated (e.g., ethoxylated, propoxylated) bisphenol A di(meth)acrylates, ethylene glycol di(meth)acrylates, neopentyl glycol di(meth)acrylates, tricyclodecane dimethanol diacrylates, triethylene glycol di(meth)acrylates, tetraethylene glycol di(meth)acrylates, tripropylene glycol di(meth)acrylates, ditrimethylolpropane tetra(meth)acrylates, dipentaerythritol penta(meth)acrylates, alkoxylated (e.g., ethoxylated, propoxylated) pentaerythritol tetra(meth)acrylate, dipentaerythritol penta(meth)acrylates, pentaerythritol tetra(meth)acrylate, alkoxylated (e.g., ethoxylated, propoxylated) trimethylolpropane tri(meth)acrylates, alkoxylated (e.g., ethoxylated, propoxylated) glyceryl tri(meth)acrylates, trimethylolpropane tri(meth)acrylates, pentaerythritol tri(meth)acrylates, tris (2-hydroxy ethyl) isocyanurate tri(meth)acrylates, 2(2-ethoxyethoxy) ethyl (meth)acrylates, 2-phenoxyethyl (meth)acrylates, 3,3,5-trimethylcyclohexyl (meth)acrylates, alkoxylated lauryl (meth)acrylates, alkoxylated phenol (meth)acrylates, alkoxylated tetrahydrofurfuryl (meth)acrylates, caprolactone (meth)acrylates, cyclic trimethylolpropane formal (meth)acrylates, dicyclopentadienyl (meth)acrylates, diethylene glycol methyl ether (meth)acrylates, alkoxylated (e.g., ethoxylated, propoxylated) nonyl phenol (meth)acrylates, isobornyl (meth)acrylates, isodecyl (meth)acrylates, isooctyl (meth)acrylates, lauryl (meth)acrylates, methoxy polyethylene glycol (meth)acrylates, octyldecyl (meth)acrylates (also known as stearyl (meth)acrylates), tetrahydrofurfuryl (meth) acrylates, tridecyl (meth)acrylates, triethylene glycol ethyl ether (meth)acrylates, t-butyl cyclohexyl (meth)acrylates, dicyclopentadiene di(meth)acrylates, phenoxyethanol (meth)acrylates, octyl (meth)acrylates, decyl (meth)acrylates, dodecyl (meth)acrylates, tetradecyl (meth)acrylates, cetyl (meth)acrylates, hexadecyl (meth)acrylates, behenyl (meth)acrylates, diethylene glycol ethyl ether (meth)acrylates, diethylene glycol butyl ether (meth)acrylates, triethylene glycol methyl ether (meth)acrylates, dodecanediol di(meth)acrylates, dipentaerythritol penta/hexa(meth)acrylates, pentaerythritol tetra(meth)acrylates, alkoxylated (e.g., ethoxylated, propoxylated) pentaerythritol tetra(meth)acrylates, di-trimethylolpropane tetra(meth)acrylates, alkoxylated (e.g., ethoxylated, propoxylated) glyceryl tri(meth) acrylates, and tris (2-hydroxy ethyl) isocyanurate tri(meth) acrylates, and combinations thereof.

Acid Stabilizer

In preferred embodiments of the invention, particularly where the light-curable composition is to be stored for an extended period of time after being formulated and prior to being utilized to prepare a cured composition, the light-curable composition additionally comprises one or more acid stabilizers (sometimes referred to in the art as anionic polymerization inhibitors). Such acid stabilizers function as inhibitors of anionic polymerization, thereby enhancing storage stability of the light-curable composition and preventing premature curing.

Preferably, the one or more acid stabilizers are selected from the group consisting of Lewis acids. The acid stabilizers are selected preferably from the group consisting of boron trifluoride, boron trifluoride etherate complexes (e.g., boron trifluoride diethyl etherate complex), boron trifluoride dihydrate, trimethylsilyl triflate, sulphur dioxide, sulphur trioxide, nitrogen oxide and mixtures thereof, most preferably from boron trifluoride etherate complexes.

Other types of suitable acid stabilizers include protic acids such as hydrogen halides (e.g., hydrogen fluoride) and sulfonic acids (e.g., p-toluenesulfonic acid).

In the light-curable composition, the content of acid stabilizer is generally between 1 and 1000 ppm by weight based on the weight of the light-curable composition, e.g., 10 to 100 ppm by weight.

Radical Stabilizer

The light-curable compositions of the present invention may include one or more radical stabilizers, which help to prevent premature polymerization due any radical mechanism such as autoxidation or thermal polymerization.

The radical stabilizers may be referred to as free radical polymerization inhibitors, and are preferably selected from hindered phenolic or polyphenolic compounds such as, hydroquinone, mono-tertiary-butyl hydroquinone, 2,5-di-tertiary-butyl-hydroquinone, p-methoxyphenol, butylated hydroxyanisole, 2,6-di-tert-butyl-p-cresol, 2,2-methylene-bis-(4-methyl-6-tert-butylphenol) (MBETBP), p-tert-butyl catechol, 1,3,5-trimethyl-2,4,6-tris(3,5-di-tert-butyl-4-hydroxybenzyl)benzene, hydroxytoluene butyl ether, and mixtures thereof.

The light-curable compositions of the present invention may comprise, for example, up to 7000 ppm by weight radical stabilizer, based on the weight of the light-curable composition, e.g., between 1 and 7000 ppm by weight radical stabilizer.

Thickening Agents

The light-curable compositions of the present invention may optionally comprise one or more thickening agents (also known as viscosity control agents, thickeners or thickening conferring agents), which serve to modulate the viscosity of the formulation, most usually increasing this property, A suitable thickening agent for formulation can be selected from those that are compatible with the monomers with which it is combined. Thickening agents are well known in the art and may be, for example, poly(meth) acrylates, acylated cellulose polymers (e.g., cellulose acetate, cellulose acetate propionate), polyvinyl acetates, partially hydrolysed polyvinyl acetates, polyvinylpyrrolidones, polyoxylates, polycaprolactones, polycyanoacrylates, vinyl acetate copolymers (for example, copolymers with vinyl chloride), copolymers of (meth)acrylates with butadiene and styrene, copolymers of vinyl chloride and acrylonitrile, copolymers of ethylene and vinyl acetate, poly[buty-leneterephthalate-co-polyethyleneglycolterephthalate], and copolymers of lactic acid and caprolactone. Such polymeric thickening agents may be distinguished from fillers, in the context of the present invention, by the fact that they are generally soluble in the light-curable resin component of the light-curable composition as well as in the polymeric matrix formed when the light-curable resin component is cured. However, it is recognized that certain of the substances taught herein as fillers may also function to some extent as thickening agents, while remaining insoluble in the light-curable resin component.

According to certain embodiments, the light-curable compositions of the present invention comprise an amount of thickening agent of up to 15% by weight, up to 12% by weight, or up to 10% by weight, based on the weight of the light-curable composition exclusive of the weight of the filler component. For example, the light-curable composition may comprise at least 0.1% by weight, at least 0.5% by weight or at least 1% by weight of thickening agent, based on the weight of the light-curable composition exclusive of the weight of the filler component.

The composition of the invention may include a thixotropic agent in order to regulate the flow behavior thereof. It may be organic or inorganic and selected from the group consisting of hydrogenated castor oil, hydrogenated castor oil modified by reaction with an amine, polyamides, and silica (e.g., hydrophobic fumed or precipitated silica). However, if a thixotropic agent is present, its concentration is typically limited to no more than 5% by weight based on the total weight of the light-curable composition.

Cure Accelerators

According to embodiments of the invention, the light-curable compositions of the present invention further comprise cure accelerators. The presence of such cure accelerators permit the light-curable compositions to cure more rapidly. Such cure accelerators may include crown ethers and calixarenes, such as 18-crown-6, 5-crown-5, dibenzo-18-crown-6, calix[4]arene. Such cure accelerators may be present in an amount of up to 5% by weight, up to 3% by weight, or up to 1% by weight, based on the weight of the light-curable composition exclusive of the weight of the filler component. The light-curable composition may comprise at least 0.1% by weight, at least 0.3% by weight or at least 0.6% by weight of cure accelerator, based on the weight of the light-curable composition exclusive of the weight of the filler component.

Thermal Cure Agents

According to embodiments of the invention, the light-curable compositions of the present invention further comprise thermal cure agents, such as azo-compounds. The presence of such thermal cure agents permit the curable composition to undergo a secondary cure when exposed to heat. Such thermal cure agents may include azobisisobutyronitrile and 1,1'-azobis(cyclohexanecarbonitrile). Such thermal cure agents may be present in an amount of up to 5% by weight, up to 3% by weight, or up to 2% by weight, based on the weight of the light-curable composition exclusive of the weight of the filler component. The light-curable composition may comprise at least 0.1% by weight, at least 0.5% by weight or at least 1% by weight of thermal cure agent, based on the weight of the light-curable composition exclusive of the weight of the filler component.

Other Additives

Depending upon the use end application and the attributes desired in the uncured and cured light-curable composition, the light-curable composition may be formulated to contain one or more additional additives other than those already mentioned, in particular one or more additives selected from the group consisting of plasticizers (e.g., acetate, trimetallate, phthalate, adipate and benzoate plasticizers), refractive index modifiers, adhesion promoters, accelerating agents (also known as cure speed regulating agents), solvents, tougheners, heat stabilizers, dyes, pigments and the like, as well as any other types of additives known in the curable resin art (especially the curable cyanoacrylate resin art).

Methods of Making, Curing and Using the Light-Curable Composition

The light-curable compositions of the present invention may be prepared by any suitable method, including simply mixing together the various desired ingredients in the desired proportions. According to certain embodiments of the invention, the light-curable resin component of the light-curable composition is prepared and stored separately from the filler component, with the two components then being combined to form the light-curable composition shortly before curing the light-curable composition. The light-curable resin component and the light-curable composition are preferably stored in packaging which is shielded from light having a wavelength effective to initiate curing of the light-curable resin component or light-curable composition. For example, the package or container may be light shielded from wavelengths between 300 nm and 750 nm. The interior surface of the package or container should also be selected to be compatible with maintaining the light-curable composition or light-curable resin composition in uncured, stable form over an extended period of storage time. For example, the interior package or container surface may be constructed of a low energy surface plastic or passivated glass or metal.

The light-curable compositions of the present invention are useful for preparing composite materials by photocuring the light-curable resin component to form a polymeric matrix. The cured polymeric matrix encompasses and binds together the filler component of the light-curable composition. The filler component serves to improve the mechanical properties, as compared to the mechanical properties of a cured polymeric matrix obtained by curing the light-curable resin component in the absence of the filler component. For example, where the filler is in the form of fiber, a fiber-reinforced composite material may be obtained by photocuring a light-curable composition in accordance with the present invention.

In general, a composite material may be defined as any material containing a reinforcement material which is supported by a binder material. Composite materials thus comprise a two-phase material having a discontinuous reinforcement material phase that is stiffer and/or stronger than the continuous binder (matrix) phase. In the context of composite materials prepared in accordance with the present invention, the filler(s) may function as a reinforcement material while the polymerix matrix formed by photocuring the light-curable resin component of the light-curable composition may function as a binder material.

Light-curable compositions in accordance with the present invention can be used as coatings, adhesives, sealants, potting compounds, encapsulants, and other such products, but are of particular interest for curing in the bulk and in the production of bulk objects or monoliths by photocuring.

A method for curing the light-curable compositions of the present invention using light irradiation may comprise irradiating the light-curable composition with electron beam, ultraviolet light, visible light or near infrared light using any suitable radiation source such as a long wave UV lamp, a low intensity arc lamp, a high intensity arc lamp, a high pressure mercury lamp, a halogen lamp, a light emitting diode (LED), a xenon lamp, or sunlight. Ultraviolet (UV) and visible light are generally preferred. The effective wavelength(s) of the irradiated light will vary depending upon the particular photoinitiator system employed, e.g., the type(s) of metallocene compound(s) and/or photocleavable compounds present in the photoinitiator system.

Thus, the light source employed should provide light in the wavelength range dictated by the particular photoinitiator system used. Ideally the wavelength of the light emitted from the light source (such as an LED) should couple strongly with the absorption of the photoinitiator system of the light-curable resin composition. While unnecessary, light in wavelengths outside the desired photopolymerization range for the particular photoinitiator system could be filtered out. Still further, the light source employed can emit light to penetrate throughout one or more faces or sides of the composite part being fabricated.

According to certain embodiments of the invention, the light-curable composition may be formulated to be capable of being cured upon exposure to light having a wavelength of 350 nm to 490 nm, or 365 nm to 465 nm, or 380 nm to 410 nm. The light intensity may be, for example, from 20 mW/cm$^2$ to 150 mW/cm$^2$, or 40 mW/cm$^2$ to 90 mW/cm$^2$. The light-curable composition may be stationary when exposed to light. Alternatively, the light-curable composition may be in motion when exposed to light (for example, on a conveyor belt). A portion of light-curable composition to be photocured in accordance with the present invention to form a composite material or article may be irradiated with light from a single direction or from multiple directions. However, a distinct advantage of the present invention is that light irradiation from just a single direction can be effective to cause complete curing of the light-curable composition throughout the composite material or article, despite the presence of filler capable of blocking penetration of the incident light or filler capable of scattering the incident light in an manner such that light does not reach all regions of light-curable resin component within the composition.

A variety of procedures for forming a composite article using the light-curable compositions of the present invention may be used. For instance, a mold for the desired composite article may be employed which has at least one face or side transparent to the initiating light so that the light can penetrate adequately to allow the photocuring to take place, a suitable light source, and the desired light-curable composition itself in an amount adequate to fill the mold. The particular sequence of the procedure actually used can vary as desired. For example, the mold can be filled either before or after the light source being used is turned on. The light-curable composition may be introduced in combined form into the mold. For instance, the filler or fillers may be dispersed in the remaining components of the light-curable composition and the mold then filled with the resulting mixture. However, the filler(s) may be introduced into the mold separately from the other components of the light-curable composition. For example, the filler as introduced into the mold may be a preform, such as a fiber mat (woven or nonwoven). According to one embodiment, the filler component when introduced into the mold may be pre-wetted or pre-impregnated with a quantity of a liquid admixture of the other components of the light-curable composition, with an additional quantity of such admixture subsequently introduced into the mold wherein the additional quantity of the admixture combines with the pre-wetted filler component. It is also possible to form structured or layered composite articles, which may be characterized by having one or more regions or layers containing little or no filler and one or more regions or layers containing a relatively high concentration of filler.

A distinct advantage of the present invention is that it makes possible the efficient production of composite articles that are relatively thick, despite the presence of substantial amounts of fillers that block or scatter light. For example, the thickness of the composite article produced in certain embodiments may in the range of about 0.1 centimeter up to about 10 centimeters or even more. The present invention is highly useful for forming composite articles in this thickness range, but the present invention is likewise amenable to forming composite articles that are much thicker than the 0.1-10 centimeter range.

However, the light-curable compositions of the present invention are also suitable for forming relatively thin composite films or coatings. Such cured composite films and coatings may, for example, have a thickness of at least 10 microns, at least 50 microns or at least 100 microns, up to 0.5 mm or 1 mm. It is also possible, within the scope of the present invention, to build up an article layer-by-layer using the light-curable compositions, wherein a first thin layer of the light-curable composition having, for example, a thickness of 10 microns to 500 microns is formed and exposed to light, with a second thin layer of the light-curable composition then being deposited on the first thin layer and exposed to light, followed by one or more successive thin layers of the light-curable composition wherein such successive thin layers are also exposed to light before depositing the next thin layer.

It should be appreciated that the present invention may be utilized to form any article, shape or part for any application. All that thus is intended by an "article" is a three-dimensional shape configured for the intended application. Using the present invention, it is also possible to produce composite articles in which one or more portions of the composite article comprise a composite material obtained by curing of a light-curable composition in accordance with the invention and one or more portions of a material (e.g., metal, ceramic, plastic) that is not derived from such light-curable composition. For example, the composite article may comprise a substrate of a first material (not derived from a light-curable composition in accordance with the invention) having at least one surface which is in contact with (e.g., adhered or bonded to) a composite material in accordance with the present invention.

The light-curable compositions of the present invention may also be utilized to fabricate useful articles by methods such as additive manufacturing (including three dimensional (3D) printing) and pultrusion. Such methods may be moldless and/or out-of-autoclave (OOA) methods. Suitable 3D printing systems include stereolithography (SLA), digital light processing (DLP), hot lithography, and continuous liquid interface production (CLIP). As an example, a dispensing head equipped with a light source may be used to impregnate a fiber strand or tow with a light-curable resin component (comprised of the components of a light-curable composition in accordance with the invention, with the exception of the fiber) to form a light-curable composition within the dispensing head and then cure the light-curable composition using light immediately after material deposition to provide a cured composite material. In this manner, a three-dimensional composite article containing oriented reinforcing fibers may be prepared, without molds or other support materials.

Light-curable compositions in accordance with the present invention are also suitable for use in Automated Fiber Placement (AFP) and Automated Tape Lay-Up (ATL) processes.

While the light-curable composition is being exposed to light in a manner effective to initiate curing, the light-curable composition may suitably be at about room temperature (e.g., about 10° C. to about 35° C.). However, it is also possible to maintain the light-curable composition while being exposed to light at an elevated temperature (e.g., greater than 35° C. to about 100° C.). If desired, a post-photocuring operation can be carried out on the thus-produced composite article. For example, thermal curing, as in a heated oven, may be utilized.

Illustrative, non-limiting aspects of the invention may be summarized as follows:

Aspect 1: A light-curable composition useful for forming a composite material, wherein the light-curable composition comprises:
  a) a photoinitiator system comprising at least one of i) a combination of at least one metallocene compound comprising a transition metal of Group VIII of the periodic table and aromatic electron system ligands and at least one photocleavable compound which generates an acyl radical when exposed to light or ii) a photocleavable metallocene compound comprising a transition metal of Group VIII of the periodic table and aromatic electron system ligands which generates an acyl radical when exposed to light;
  b) at least one cyanoacrylate; and
  c) at least 10% by weight, based on total weight of the light-curable composition, of at least one filler.

Aspect 2: The light-curable composition of Aspect 1, wherein the at least one filler comprises at least one opaque filler.

Aspect 3: The light-curable composition of Aspect 1 or 2, wherein the at least one cyanoacrylate forms a solid resin matrix when cured and the at least one filler comprises at least one filler which remains insoluble in the solid resin matrix.

Aspect 4: The light-curable composition of any one of Aspects 1 to 3, wherein the at least one filler includes at least one opaque inorganic filler.

Aspect 5: The light-curable composition of any one of Aspects 1 to 4, wherein the at least one filler includes at least one fibrous filler.

Aspect 6: The light-curable composition of Aspect 5, wherein the at least one fibrous filler is selected from the group consisting of carbon fibers, glass fibers, silicon carbide fillers, boron fibers, polymeric fibers, metal fibers, natural fibers, basalt fibers, and combinations thereof.

Aspect 7: The light-curable composition of Aspect 5 or 6, wherein the at least one fibrous filler comprises carbon fibers.

Aspect 8: The light-curable composition of any one of Aspects 5 to 7, wherein the at least one fibrous filler is in a form selected from the group consisting of short fibers less than 10 mm in length, chopped fibers, long fibers having a length of 10 mm or more, continuous fibers, woven continuous fibers, nonwoven continuous fibers, mats of woven fibers, mats of nonwoven fibers, biaxial mats, unidirectional mats, continuous strands, unidirectional fibers, fiber tows, fiber fabrics, braided fibers, knitted fibers, and combinations thereof.

Aspect 9: The light-curable composition of any one of Aspects 1 to 8, comprising at least 20% by weight, based on total weight of the light-curable composition, of at least one filler.

Aspect 10: The light-curable composition of any one of Aspects 1 to 9, wherein the filler has an aspect ratio of 1:1 or higher, greater than 1:1, at least 2:1, at least 3:1, at least 5:1, at least 10:1, at least 100:1, at least 1000:1; at least 10,000:1, at least 100,000:1, at least 500,000:1, or at least 1,000,000:1.

Aspect 11: The light-curable composition of any one of Aspects 1 to 10, comprising at least 30% by weight glass fibers.

Aspect 12: The light-curable composition of any one of Aspects 1 to 11, wherein the photoinitiator system comprises at least one metallocene compound in which each of the aromatic electron system ligands in the metallocene compound is π-arene, indenyl, or η-cyclopentadienyl ligand.

Aspect 13: The light-curable composition of any one of Aspects 1 to 12, wherein the photoinitiator system comprises at least one metallocene compound comprising a transition metal selected from the group consisting of iron, osmium, and ruthenium.

Aspect 14: The light-curable composition of any one of Aspects 1 to 13, wherein the photoinitiator system comprises at least one metallocene compound of formula (V):

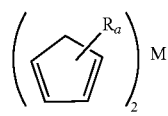
(V)

wherein M represents a transition metal of Group VIII of the periodic table (preferably Fe, Os, or Ru); R represents a halogen atom, a hydrocarbon group having 1 to 20 carbon atoms (preferably 1 to 5 carbon atoms if the hydrocarbon group is an alkyl group; and 'a' is an integer of 0 or 1.

Aspect 15: The light-curable composition of any one of Aspects 1 to 14, wherein the photoinitiator system comprises at least one metallocene compound selected from the group consisting of ferrocene compounds.

Aspect 16: The light-curable composition of any one of Aspects 1 to 15, wherein the photoinitiator system comprises at least one of an acylgermane compound or an acylphosphine oxide.

Aspect 17: The light-curable composition of any one of Aspects 1 to 16, wherein the photoinitiator system comprises at least one of a ferrocene compound of formula (I), an acylgermane compound of formula (II), an acylgermane compound of formula (III), or an acylgermane compound of formula (IV):

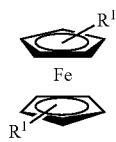
(I)

wherein $R^1$ is hydrogen or $C_1$-$C_4$ alkyl, with each $R^1$ group being the same or different;

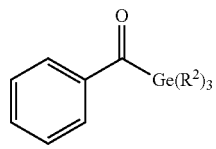
(II)

wherein $R^2$ is methyl or phenyl;

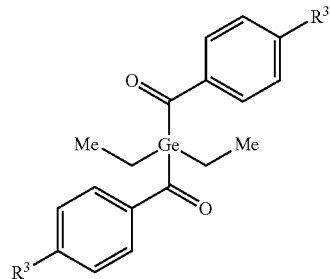
(III)

wherein $R^3$ is hydrogen or methoxy;

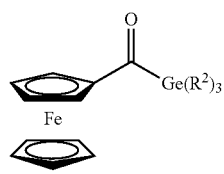
(IV)

wherein $R^2$ is methyl or phenyl.

Aspect 18: The light-curable composition of any one of Aspects 1 to 17, additionally comprising at least one acid stabilizer compound.

Aspect 19: The light-curable composition of any one of Aspects 1 to 18, additionally comprising at least one acid stabilizer compound selected from the group consisting of Lewis acids.

Aspect 20: The light-curable composition of any one of Aspects 1 to 19, wherein the at least one cyanoacrylate comprises at least one cyanoacrylate of formula (VI):

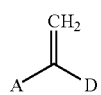
(VI)

wherein:
A is CN; and D is a carboxylic ester moiety $C_2R^4$, wherein
$R^4$ is selected from the group consisting of: $C_1$-$C_{18}$ linear and branched alkyl chains; terminally trimethylsilylated $C_1$-$C_3$ alkyl chains; —$CH_2CF_3$; —$CH_2CF_2CF_3$; —$CH_2(CF_2)_2H$; —$CH_2(CF_2)_4H$; —$CH(CF_3)CH_3$; allyl; propargyl; cyclohexyl; cyclohexenyl; methylcyclohexyl; methylcyclohexenyl; ethylcyclohexyl; ethylcyclohexenyl; furfuryl; phenylethyl; phenoxyethyl; an acrylic ester moiety of formula (VII):

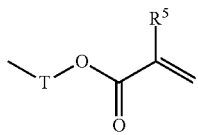

(VII)

wherein

T is: $(CH_2)_Z$, wherein the value of z is between 2 and 12 inclusive, a $C_3$-$C_{12}$ branched alkylene chain; cyclohexyl; bisphenyl, bisphenol, and $R^5$ is H, Me, CN or $CO_2R^6$, wherein $R^6$ is a methyl or ethyl group;

a group of formula (VIII)

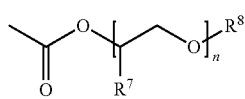

(VIII)

wherein $R^7$ is selected from the group consisting of H and Me, $R^8$ is selected from the group consisting of $Si(Me_3)_3$ and $C_1$-$C_6$ linear and branched alkyl chains, and the value of n is from 1 to 3 inclusive, Aspect 21: The light-curable composition of any one of Aspects 1 to 20, additionally comprising at least one (meth)acrylate-functionalized compound.

Aspect 22: A light-curable composition useful for forming a composite material, wherein the light-curable composition comprises:

a) a photoinitiator system comprising a combination of at least one ferrocene compound of formula (I) and at least one acylgermane compound of formula (II) or formula (III):

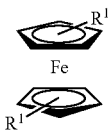

(I)

wherein $R^1$ is hydrogen or $C_1$-$C_4$ alkyl, each $R^1$ group is the same or different, and one or more $R^1$ groups are present in one or both cyclopentadienyl groups;

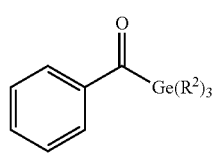

(II)

wherein $R^2$ is methyl or phenyl;

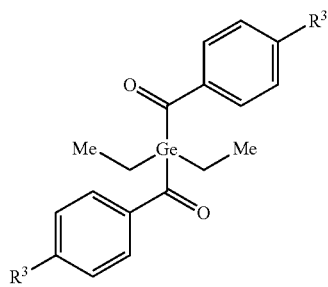

(III)

wherein $R^3$ is hydrogen or methoxy;

b) at least one compound cyanoacrylate;

c) at least 20% by weight, based on total weight of the light-curable composition, of carbon fibers; and d) at least one acid stabilizer compound selected from the group consisting of Lewis acids.

Aspect 23: A method of making a composite material, wherein the method comprises light curing the light-curable composition of any of Aspects 1 to 22.

Aspect 24: The method of Aspect 23, wherein the method utilizes at least one of ultraviolet or visible light.

Aspect 25: The method of Aspect 23 or 24, wherein the light-curable composition is disposed as a layer having a thickness of at least 1 mm and exposing at least one side of the layer to light.

Aspect 26: The method of any one of Aspects 23 to 25, wherein curing of the layer of the light-curable composition is achieved throughout the thickness of the layer.

Aspect 27: The method of any one of Aspects 23 to 26, wherein the composite material is obtained by 3D printing or pultrusion.

Aspect 28: A composite material obtained with the method of any one of Aspects 23 to 27.

Aspect 29: A composite material which is the cured reaction product of a light-curable composition comprised of, consisting essentially or, or consisting of:

a) a photoinitiator system comprising at least one of i) a combination of at least one metallocene compound comprising a transition metal of Group VIII of the periodic table and aromatic electron system ligands and at least one photocleavable compound which generates an acyl radical when exposed to light or ii) a photocleavable metallocene compound comprising a transition metal of Group VIII of the periodic table and aromatic electron system ligands which generates an acyl radical when exposed to light;

b) at least one cyanoacrylate; and c) at least 10% by weight, based on total weight of the light-curable composition, of at least one filler.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the light-curable compositions, composite materials prepared therefrom and methods for making and using such light-curable compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

Light-Curable Compositions:

Light-curable compositions were prepared using fiber loadings of 20 wt % carbon fiber/80 wt % resin, 35 wt % carbon fiber/65 wt % resin, and 50 wt % carbon fiber/50 wt % resin. The resin used was a methoxyethyl cyanoacrylate (MECA) based formulation which also contained 50 ppm acid stabilizer (boron trifluoride etherate), 800 ppm of acylgermane photoinitiator (bis-(4-methoxybenzoyl)diethyl germane marketed under reference Ivocerin®), and 200 ppm of ferrocene (dicyclopentadienyl iron).

Experimental Procedure for Curing of Light-Curable Compositions Containing Resin and Reinforcing Fibers:

Cured pieces of fiber-reinforced resin (i.e., composite material samples) were prepared either in a ⅛" thick rectangular piece by pouring the light-curable composition into a silicone mold and curing, or prepared as thin films of resin and fiber (one or two layers of fiber strands thick) pressed directly between two glass plates and cured. For the ⅛" rectangular pieces, strands of fiber were cut to roughly match the length of the piece to be molded and cured, and were weighed out to prepare samples of either 20%, 35%, or 50% loading of fiber, by weight. The fibers were placed in the mold, aligned roughly in parallel with one another. The resin was then added to the mold, wetting the fibers. If desired, tweezers can be used to manipulate the fibers to ensure thorough wetting of the resin and fibers, eliminating any pockets of air or dry spots between fibers (where two fiber strands might be pressed together such that resin has not worked its way in between the two strands). This silicone mold, now containing the uncured resin and fibers, is placed between two glass plates and squeezed together using two to four binder clips, preserving uniform thickness of the rectangular space containing the light-curable composition prior to curing. The silicone mold (now sandwiched between glass plates) is then placed under an LED emitting light at a wavelength of 395 nm. The exposure time was controlled by a conveyor belt that passes the mold underneath the LED at approximately 50 feet per second. After the first pass under the LED, the sample is flipped over and passed under the LED again at 50 feet per second, exposing the light-curable composition and mold to UV light from the direction opposite of the first LED exposure. At this point, the ⅛" thick piece was observed to be cured at the surface, although not necessarily cured all the way through to the center. After letting the sample sit overnight, whether stored in a lit room or in the dark, the curing proceeds to completion, resulting in a fully-cured ⅛" thick piece of fiber-reinforced polymer (composite material). For a simple film of fiber and resin placed between glass plates, the sample is also cured under the LED with one pass on each side at 50 fps, and the further portion of the curing process (i.e., following exposure to the LED) was found to reach completion in approximately 2 hours based on visual inspection.

Property Testing of Cured Material

Properties of the cured neat resin (without fiber reinforcement) were analyzed by DMA for glass transition temperature and flexural storage modulus, and by ASTM D638 for tensile properties. The neat resin, when cured, was observed to have a Tg of 102° C., a tensile strength of 27.4 MPa, and a tensile modulus of 619 MPa. The flexural storage modulus in DMA was approximately 0.98 GPa. For the composite containing 20% by weight carbon fiber, the Tg was unchanged at 102° C. and the cured carbon fiber-containing resin has a flexural storage modulus of approximately 4 GPa. For the composite containing 35% by weight carbon fiber, the Tg was 93° C. For the composite containing 50% by weight carbon fiber, the Tg was 101° C. and the flexural storage modulus in DMA was approximately 7.1 GPa.

Example 2

Light-curable compositions were prepared using the components shown in the table below (% indicated as a % by weight based on the weight of the curable compounds). SR454 corresponds to ethoxylated (3 EO) trimethylolpropane triacrylate. SR349 corresponds to ethoxylated (3 EO) bisphenol A diacrylate. SR833 corresponds to tricyclodecanedimethanol diacrylate. SR368 corresponds to tris(2-hydroxyethyl) isocyanurate triacrylate.

| Component | 1 | 2 | 3 | 4 | 5 |
|---|---|---|---|---|---|
| MECA | 100% | 80% | 80% | 80% | 80% |
| SR454 | | 10% | | | |
| SR349 | | 10% | | | |
| SR833 | | | | 20% | 10% |
| SR368 | 200 ppm | 200 ppm | 400 ppm | 10% | 20% |
| Ferrocene | | | | 400 ppm | 400 ppm |
| Ivocerin | 800 ppm | 800 ppm | 640 ppm | 640 ppm | 640 ppm |
| Irgacure 819 | | | 1150 ppm | 1150 ppm | 1150 ppm |
| 18-crown-6 | | | 0.3% | 0.3% | 0.3% |

Cure speed measurements were conducted via UV-FTIR, and results were compared by plotting the change in absorbance of the 802 cm$^{-1}$ peak as a function of time. The results shown in FIG. 1 indicate that addition of (meth)acrylate monomers and crown ether accelerants can effectively boost cure speed of MECA-based compositions.

Resins 1-5 were formulated in a light-curable compositions using fiber loadings of 20 wt % carbon fiber/80 wt % resin, 35 wt % carbon fiber/65 wt % resin, and 50 wt % carbon fiber/50 wt % resin, that are readily cured throughout their depth using the curing method of example 1.

The invention claimed is:

1. A light-curable composition useful for forming a composite material, wherein the light-curable composition comprises:

a) a photoinitiator system comprising at least one of i) a combination of at least one metallocene compound comprising a transition metal of Group VIII of the periodic table and aromatic electron system ligands and at least one photocleavable compound which generates an acyl radical when exposed to light or ii) a photocleavable metallocene compound comprising a transition metal of Group VIII of the periodic table and aromatic electron system ligands which generates an acyl radical when exposed to light;
b) at least one cyanoacrylate; and
c) at least 10% by weight, based on total weight of the light-curable composition, of at least one opaque filler.

2. The light-curable composition of claim 1, wherein the at least one cyanoacrylate forms a solid resin matrix when cured and the at least one filler comprises at least one filler which remains insoluble in the solid resin matrix.

3. The light-curable composition of claim 1, wherein the at least one opaque filler includes at least one opaque inorganic filler.

4. The light-curable composition of claim 1, wherein the at least one filler includes at least one fibrous filler.

5. The light-curable composition of claim 4, wherein the at least one fibrous filler is selected from the group consisting of carbon fibers, glass fibers, silicon carbide fillers, boron fibers, polymeric fibers, metal fibers, natural fibers, basalt fibers, and combinations thereof.

6. The light-curable composition of claim 4, wherein the at least one fibrous filler comprises carbon fibers.

7. The light-curable composition of claim 4, wherein the at least one fibrous filler is in a form selected from the group consisting of short fibers less than 10 mm in length, chopped fibers, long fibers having a length of 10 mm or more, continuous fibers, woven continuous fibers, nonwoven continuous fibers, mats of woven fibers, mats of nonwoven fibers, biaxial mats, unidirectional mats, continuous strands, unidirectional fibers, fiber tows, fiber fabrics, braided fibers, knitted fibers, and combinations thereof.

8. The light-curable composition of claim 1, comprising at least 20% by weight, based on total weight of the light-curable composition, of the at least one filler.

9. The light-curable composition of claim 1, wherein the filler has an aspect ratio of 1:1 or higher, greater than 1:1, at least 2:1, at least 3:1, at least 5:1, at least 10:1, at least 100:1, at least 1000:1; at least 10,000:1, at least 100,000:1, at least 500,000:1, or at least 1,000,000:1.

10. The light-curable composition of claim 1, comprising at least 30% by weight glass fibers.

11. The light-curable composition of claim 1, wherein the photoinitiator system comprises at least one metallocene compound in which each of the aromatic electron system ligands in the metallocene compound is a π-arene, indenyl, or η-cyclopentadienyl ligand.

12. The light-curable composition of claim 1, wherein the photoinitiator system comprises at least one metallocene compound comprising a transition metal selected from the group consisting of iron, osmium, and ruthenium.

13. The light-curable composition of claim 1, wherein the photoinitiator system comprises at least one metallocene compound of formula (V):

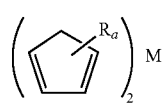

(V)

wherein M represents Fe, Os, or Ru; R represents a halogen atom, a hydrocarbon group having 1 to 20 carbon atoms, a halogenated hydrocarbon group having 1 to 20 carbon atoms, or a silicon atom-containing, oxygen atom-containing, sulfur atom-containing, phosphorus atom-containing or germanium atom-containing group having 1 to 20 carbon atoms, wherein each R may be the same or different and may be covalently bonded to each other; and a is an integer of 0 to 5.

14. The light-curable composition of claim 1, wherein the photoinitiator system comprises at least one metallocene compound selected from the group consisting of ferrocene compounds.

15. The light-curable composition of claim 1, wherein the photoinitiator system comprises at least one of an acylgermane compound or an acylphosphine oxide.

16. The light-curable composition of claim 1, wherein the photoinitiator system comprises at least one of a ferrocene compound of formula (I), an acylgermane compound of formula (II), an acylgermane compound of formula (III), or an acylgermane compound of formula (IV):

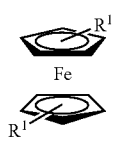

(I)

wherein $R^1$ is hydrogen or $C_1$-$C_4$ alkyl, with each $R^1$ group being the same or different;

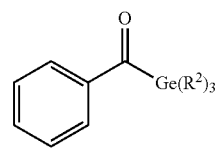

(II)

wherein $R^2$ is methyl or phenyl;

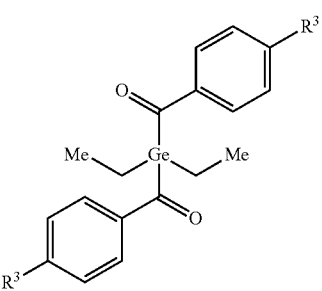

(III)

wherein $R^3$ is hydrogen or methoxy;

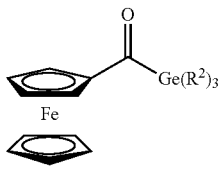

wherein $R^2$ is methyl or phenyl.

17. The light-curable composition of claim 1, additionally comprising at least one acid stabilizer compound.

18. The light-curable composition of claim 1, additionally comprising at least one acid stabilizer compound selected from the group consisting of Lewis acids.

19. The light-curable composition of claim 1, wherein the at least one cyanoacrylate comprises at least one cyanoacrylate of formula (VI):

wherein:
A is CN; and
D is a carboxylic ester moiety $CO_2R^1$,
wherein
$R^1$ is selected from the group consisting of: C1-C18 linear and branched alkyl chains; terminally trimethylsilylated $C_1$-$C_3$ alkyl chains; —$CH_2CF_3$; —$CH_2CF_2CF_3$; —$CH_2(CF_2)_2H$; —$CH_2(CF_2)_4H$; —$CH(CF_3)CH_3$; allyl; propargyl; cyclohexyl; cyclohexenyl; methylcyclohexyl; methylcyclohexenyl; ethylcyclohexyl; ethylcyclohexenyl; furfuryl; phenylethyl; phenoxyethyl; an acrylic ester moiety of formula (VII):

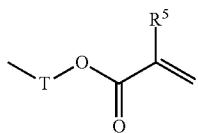

wherein
T is: $(CH_2)_z$, wherein the value of z is between 2 and 12 inclusive, a $C_3$-$C_{12}$ branched alkylene chain; cyclohexyl; bisphenyl, bisphenol, and $R^5$ is H, Me, CN or $CO_2R^6$, wherein $R^6$ is a methyl or ethyl group;
a group of formula (VIII)

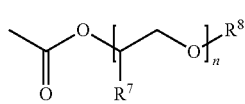

wherein
$R^7$ is selected from the group consisting of H and Me, $R^8$ is selected from the group consisting of $Si(Me_3)_3$ and $C_1$-$C_6$ linear and branched alkyl chains, and the value of n is from 1 to 3 inclusive.

20. The light-curable composition of claim 1, additionally comprising at least one (meth)acrylate-functionalized compound other than a cyanoacrylate.

21. A light-curable composition useful for forming a composite material, wherein the light-curable composition comprises:
a) a photoinitiator system comprising a combination of at least one ferrocene compound of formula (I) and at least one acylgermane compound of formula (II) or formula (III):

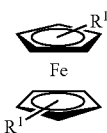

wherein $R^1$ is hydrogen or $C_1$-$C_4$ alkyl, each $R^1$ group is the same or different, and one or more R groups are present in one or both cyclopentadienyl groups;

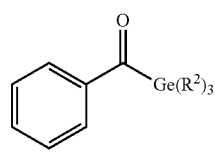

wherein $R^2$ is methyl or phenyl;

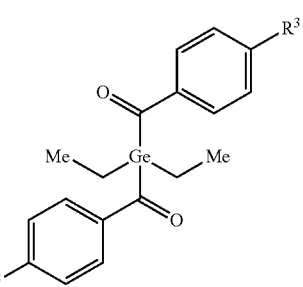

wherein $R^3$ is hydrogen or methoxy;
b) at least one cyanoacrylate;
c) at least 20% by weight, based on total weight of the light-curable composition, of opaque carbon fibers; and
d) at least one acid stabilizer compound selected from the group consisting of Lewis acids.

22. A method of making a composite material, wherein the method comprises light curing the light-curable composition of claim 1.

23. The method of claim 22, wherein the method utilizes at least one of ultraviolet or visible light.

24. The method of claim 22, wherein the light-curable composition is disposed as a layer having a thickness of at least 1 mm and exposing at least one side of the layer to light.

25. The method of claim 22, wherein curing of the layer of the light-curable composition is achieved throughout the thickness of the layer.

26. The method of claim 22, wherein the composite material is obtained by 3D printing or pultrusion.

27. A composite material obtained with the method of claim 22.

28. A composite material which is the cured reaction product of a light-curable composition comprised of:
   a) a photoinitiator system comprising at least one of i) a combination of at least one metallocene compound comprising a transition metal of Group VIII of the periodic table and aromatic electron system ligands and at least one photocleavable compound which generates an acyl radical when exposed to light or ii) a photocleavable metallocene compound comprising a transition metal of Group VIII of the periodic table and aromatic electron system ligands which generates an acyl radical when exposed to light;
   b) at least one cyanoacrylate; and
   c) at least 10% by weight, based on total weight of the light-curable composition, of at least one opaque filler.

* * * * *